March 17, 1953    J. J. ALBRIGHT, JR    2,631,602
FLOAT OPERATING INLET CONTROL VALVE MECHANISM
Filed Dec. 15, 1949
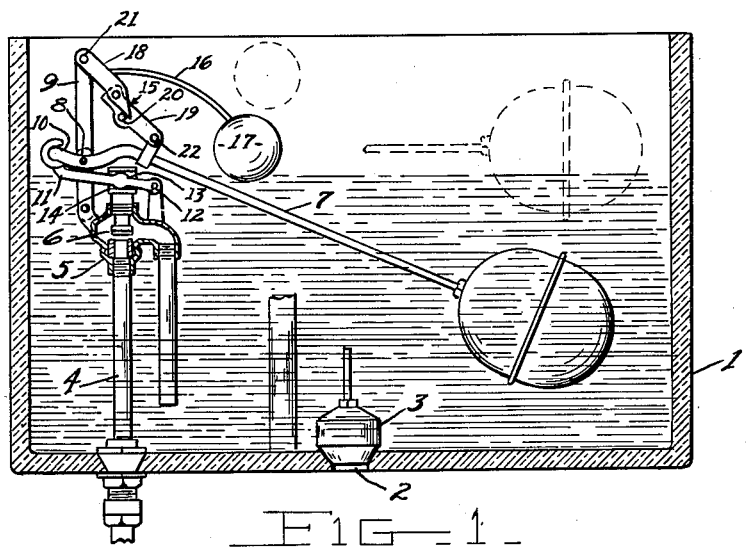
FIG-1
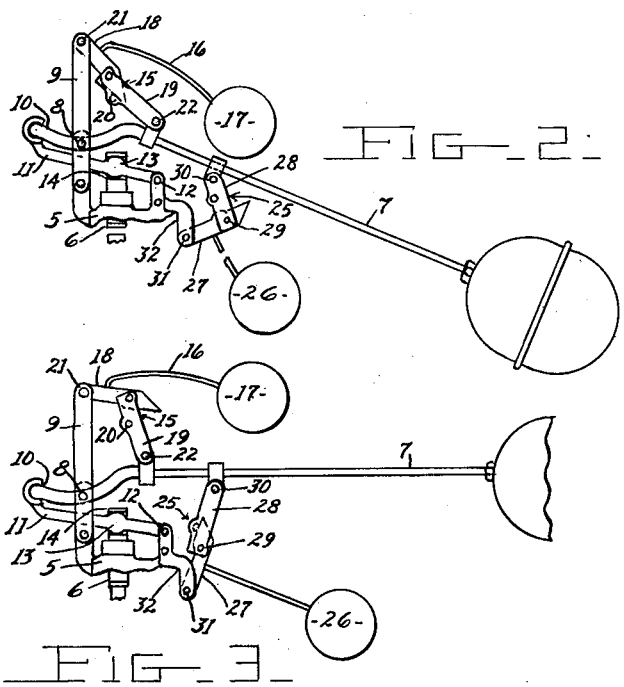
FIG-2
FIG-3
INVENTOR.
John J. Albright, Jr.
BY Bodell & Thompson
ATTORNEYS Patented Mar. 17, 1953

2,631,602

UNITED STATES PATENT OFFICE 2,631,602

FLOAT OPERATING INLET CONTROL VALVE MECHANISM

John J. Albright, Jr., Syracuse, N. Y.

Application December 15, 1949, Serial No. 133,080

3 Claims. (Cl. 137—418)

This invention relates to float operated inlet valves for tanks having a dump valve controlled outlet as, for one instance, the inlet valve of the tank of a flush toilet mechanism.

It has for its object a float operated lock acting on the float lever of the float valve mechanism, which lock is normally unlocked when the tank is full to a normal high level, to permit opening of the inlet valve as the water runs out of the outlet of the tank, and moves to locked position when the tank empties, and is shifted to unlocked position by the action of the float of the lock when the water reaches a predetermined high level in the tank, so that the float lever is locked down and remains submerged until the high water level is reached and hence the valve is closed quickly, or with something of a snap action by the quick rising of the float lever when released, instead of gradually closing, as heretofore, as the float lever rises on the surface of the water in the tank as the water fills into the tank.

The delay of the opening of the inlet valve, that is the causing of the valve to close with something of a snap action, shortens the time it takes to fill the tank and eliminates the excessive noise now present in flush toilet mechanisms due to the gradual closing of the inlet valve under the action of the usual float lever as it rises on the surface of the water filling into the tank. The snap action closing also reduces the wear which causes leakage of the valve due to the gradual closing.

Although the invention is shown as embodied in the tank of a flush toilet, it is applicable to control the flowing of water or liquid into tanks in other situations.

The invention consists in the novel features and in the combinations and constructions hereinafter set forth and claimed.

In describing this invention, reference is had to the accompanying drawings in which like characters designate corresponding parts in all the views.

Figure 1 is an elevation, partly in section, of one embodiment of the invention, the tank being also shown.

Figure 2 is a similar view of the mechanism with the tank omitted but in addition showing a float operated lock in the bottom of the tank which holds the main float operated lever from dropping as the liquid recedes, until the water falls below the level of the float of the second lock.

Figure 3 is a view similar to Figure 2 showing the second lock in its operated position wherein it is holding the main float operated lever from dropping.

In the drawing, 1 designates the tank having an outlet 2 to the point of delivery of the water, the outlet being controlled by the usual dump valve 3, which is usually, although not necessarily, manually operated.

4 designates a support for the inlet valve mechanism, this being shown as a unitary structure including a valve casing 5 mounted on the upper end of a support and having a self-opening valve 6 therein which is operated by the usual float operated lever 7 to closed position when the high level is reached in the tank. The support 4 is shown as including the inlet pipe for the water.

The float lever 7 is here shown as fulcrumed at 8 to an upright member 9 carried by the valve casing 5, the lever 7 having a short arm 10 which coacts with a motion transmitting lever 11 fulcrumed at 12 to a bracket on the valve casing and coacting at 13 with the valve stem 14. The construction of the valve mechanism thus far described is standard and per se forms no part of this invention.

The invention relates to the lock, or locks, to be described acting on the float lever 7 to hold it from closing the inlet valve 6 gradually as the water rises in the tank through the open inlet valve but causing the valve to close suddenly.

15 designates a float operated lock which is moved to locked position during the flowing out of the water from high level from the tank. During the flowing out of the water, the float 7 drops to its lowermost position opening the inlet valve 6 and is locked by the lock 15 in its lowermost position. When the dump valve 3 closes, the water rises in the tank until it picks up the float 17 of the lock 15 and unlocks the lock 15, permitting the float lever, which is now submerged, to rise suddenly and close the inlet valve 6. The float 17 is located in the top of the tank. Hence, the closing of the inlet valve is delayed until the tank is filled to the normal high level. The lock 15 is provided with an arm 16 having the float 17 thereon.

As here shown, the lock 15 consists of a toggle comprising two links 18 and 19 pivoted together at 20 by a stop joint and pivoted at their outer ends respectively at 21 to the upright support 9, and at 22 to the float operated lever 7. When the water recedes in the tank, the float 17 drops and straightens the toggle links 18, 19, from folded position, thus permitting the float lever 7 to drop with the receding water and open the inlet valve 6. When the water rises in the tank, after the dump valve 3 is closed, the float operated lever 7 is locked in its lower position assumed when the inlet valve is open, by the straightened toggle links until the water reaches a level wherein it picks up the float 17 and moves the toggle links 18, 19 to folded position.

In the form shown in Figures 2 and 3, there is not only the lock 15, but also a second float operated lock 25 having its float 26 located in the lower portion or near the bottom of the tank. This second lock normally locks the main float lever 7 in its elevated position until the water recedes below the level of the float 26 when the float operated lever 7 drops suddenly to the bottom of the tank where it is locked from rising on the incoming water by the upper float operated lock 15. As the water rises in the tank, the second operated float lock 25 acts on the float lever 7 and tends to lift it and move it to valve closing position. It is restrained from doing so however until a high level is reached in the tank sufficient to elevate the float 17 of the upper lock 15 and break the toggle of the upper lock 15, permitting the float operated lever 7 to return quickly to its elevated position on the surface of the water.

In the operation of the forms shown in Figures 2 and 3, the float lever 7 remains in its elevated position until the water recedes in the tank, not only a sufficient amount to unlock the upper lock 15, but also until the water recedes far enough to release the float 26 of the lower lock 25. The lower lock 25 is also a toggle consisting of toggle links 27 and 28 pivoted together at 29 by a stop joint and at their outer ends respectively at 30 to the lever 7, and at 31 to a bracket 32 carried by the valve casing. In either form of the invention, the closing of the inlet valve by the float lever 7 is delayed until the water has risen to a high level in the tank.

In the form shown in Figure 1, the float lever 7 rides down on the surface of the water as the water recedes and is locked down by the upper lock 15 until the water reaches the normal high level. In the form shown in Figures 2 and 3, the float lever 7 is locked in its upper position by the lock 25 until the water recedes until it uncovers the float 26 of the lower lock 25. Now, however, the float lever 7 is locked down by the upper lock 15 until the water fills into the tank in the normal high to float the float 17 and unlock the upper lock.

What I claim is:

1. A float operated inlet control valve mechanism of the class described for tanks having a valve controlled inlet, which mechanism comprises a casing and support mountable in the tank, a self opening valve in the casing and a float operated lever acting on the valve to close it when a predetermined water level is reached; said mechanism being characterized by a float operated lock comprising a pair of toggle links pivoted together at their inner ends and pivoted at their outer ends respectively to the valve casing support and the float lever, and movable by the lock float out of dead center locked position of the toggle links by the high level of the fluid in the tank, and being movable into dead center locked position by the lowering of the float of the toggle lock under the recession of the water from the tank.

2. A float operated inlet control valve mechanism of the class described for tanks having a valve controlled inlet, which mechanism comprises a casing and support mountable in the tank, a self opening valve in the casing and a float operated lever acting on the valve to close it when a predetermined water level is reached; said mechanism being characterized by a float operated lock acting on the float operated lever to lock it in its position assumed when the valve is open, the float of the lock being locatable in position to unlock the lock when the water level reaches a predetermined height in the tank, a second float operated lock having its float located in the lower portion of the tank and coacting with the float lever to normally hold it from recession with the water in the tank, and movable to unlocked position by the recession of the water in the tank to a low level, and to locked position by the rising of the float of the second lock as the water rises in the tank.

3. A float operated inlet control valve mechanism of the class described for tanks having a valve controlled inlet, which mechanism comprises a casing and support mountable in the tank, a self opening valve in the casing and a float operated lever acting on the valve to close it when a predetermined water level is reached; said mechanism being characterized by a float operated lock comprising a pair of toggle links pivoted together at their inner ends and pivoted at their outer ends respectively to the valve casing support and the float lever, and movable by the lock float out of dead center locked position of the toggle links by the high level of the fluid in the tank, and being movable into dead center locked position by the lowering of the float of the toggle lock under the recession of the water from the tank, a second float operated lock having its float located in the lower portion of the tank and comprising a pair of toggle links pivoted together at their inner ends and at their outer ends pivoted to said float lever and to the valve casing support, and movable out of dead center position upon the recession of the water in the tank and to locked position upon the rising of the water in the tank.

JOHN J. ALBRIGHT, Jr.

REFERENCES CITED

The following references are of record in the file of this patent:

UNITED STATES PATENTS

| Number | Name | Date |
|---|---|---|
| 565,881 | Closson | Aug. 18, 1896 |
| 974,925 | Schulte | Nov. 8, 1910 |
| 1,115,584 | Schmitz | Nov. 3, 1914 |
| 1,263,699 | Pool | Apr. 23, 1918 |
| 2,504,022 | Hohner | Apr. 11, 1950 |